Dec. 18, 1934.  R. J. STICKLES  1,984,661
THROTTLE VALVE CONTROLLER FOR TRACTORS
Filed July 26, 1930  2 Sheets-Sheet 1
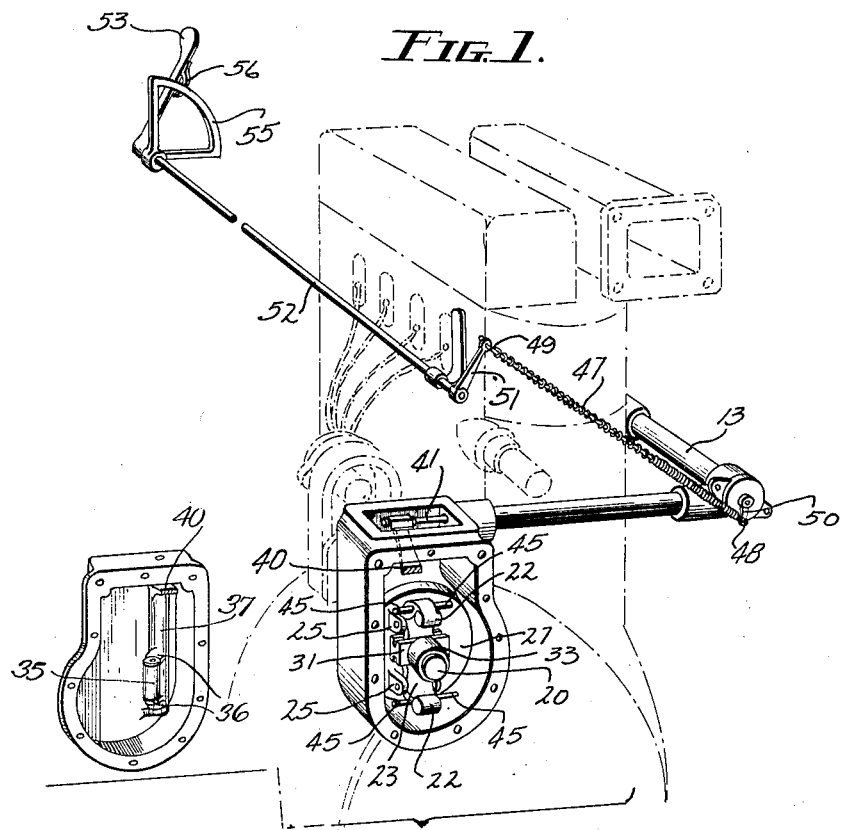
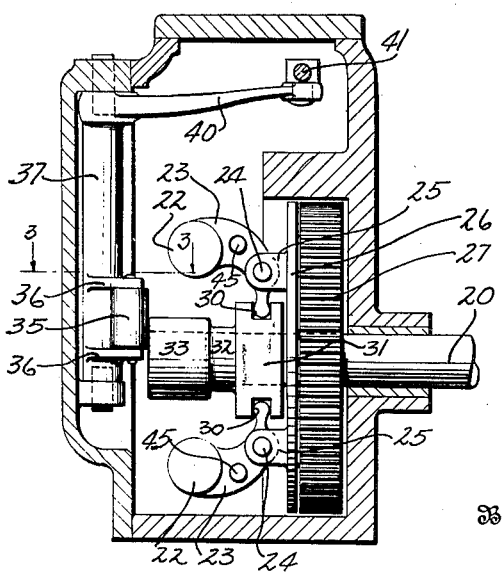
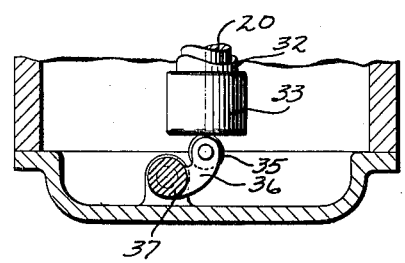
Inventor
Rollo J. Stickles
By Wheeler, Wheeler & Wheeler
Attorney Dec. 18, 1934.   R. J. STICKLES   1,984,661
THROTTLE VALVE CONTROLLER FOR TRACTORS
Filed July 26, 1930   2 Sheets-Sheet 2
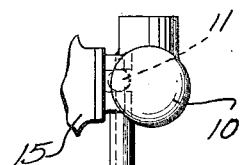
FIG. 4.
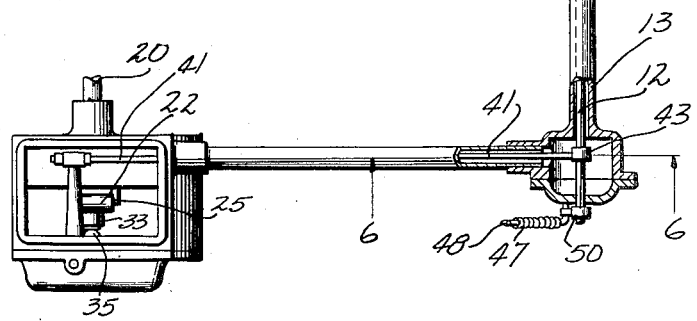
FIG. 5.
FIG. 6.
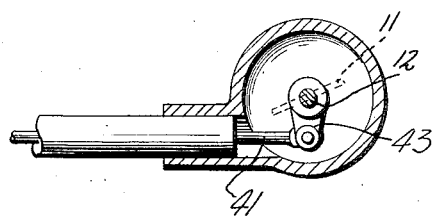
Inventor
Rollo J. Stickles
By Wheeler, Wheeler & Wheeler
Attorney Patented Dec. 18, 1934

1,984,661

UNITED STATES PATENT OFFICE 1,984,661

THROTTLE VALVE CONTROLLER FOR TRACTORS

Rollo J. Stickles, Sullivan, Wis.

Application July 26, 1930, Serial No. 470,903

10 Claims. (Cl. 264—3)

My invention relates to improvement in throttle controlling mechanisms for internal combustion engines, with particular reference to engines of that class which include centrifugal speed governors operatively connected with a throttle valve for speed limiting purposes.

The object of my invention is to provide practical and efficient means whereby at all times the throttle valve may be subject to automatic control by a speed governor and also subject to manual control to establish a different range of automatic control or to allow the operator to run the engine at a higher speed than would be permitted by the automatic governor under normal conditions of operation.

More particularly stated, it is my object to provide means whereby a centrifugal governor may be set to establish a normal throttle control, which may be modified by the operator from time to time by shifting a throttle controlling lever, with no material variation in the action of the governor in response to speed in excess of that which it was originally set to control. The manual throttle control may comprise a hand lever provided with a detent or other means for detaining it in any position in which it may be set. It is my object to provide a construction which will allow this lever to be set, while still allowing the speed governor to operate as before but within a new range of speed control established by the resetting of the lever. For example, assuming the speed governor to be set for control of the operation of a tractor at an assumed normal speed of five miles per hour, the operator may shift a hand lever to open the throttle, and in my improved construction this may be done without materially changing the resistance to the operation of the governing weights, the resistance to the outward movement of the weights remaining substantially the same for any given speed.

In the drawings:

Figure 1 is a perspective view of my improved controlling mechanism as applied to the internal combustion engine of a tractor, the latter being partially indicated in dotted lines to show the relation of my improvement thereto, and the top casing cap of the centrifugal speed governor being removed, and the front casing cap being illustrated in a detached position reversed to expose the working parts of the governing mechanism associated therewith.

Figure 2 is a detail view of the centrifugal speed governor as seen from the inner side, showing a portion of the cap and the vertically disposed rock shaft 37 and associated parts, said cap and portions of the casing wall being removed in a vertical plane which includes the axis of the magneto shaft.

Figure 3 is a fragmentary sectional view drawn to line 3—3 of Figure 2, showing the lower part of rock shaft 37, together with its arm 36 and roller 35 in operative relation to the hub 33 of the governing sleeve 32 and shaft 20, fragments of the sleeve and shaft being also illustrated.

Figure 4 is a fragmentary plan view, partly in horizontal section, showing the relation of the automatic governor to the throttle valve.

Figure 5 is an enlarged detail view of the resiliently extensible link between the tractor shaft and the manually operated rock shaft.

Figure 6 is a sectional view drawn generally to line 6—6 of Figure 4.

Like parts are identified by the same reference characters throughout the several views.

The drawings illustrate an embodiment of my invention as applied to a well known form of tractor commercially known as a McCormick-Deering tractor.

In general organization, these tractors have a carbureter which is conventionally illustrated at 10 in Figure 4, and which is provided with an outlet controlled by a throttle valve 11 of the so called butterfly type, said throttle valve being mounted upon an oscillatory shaft or rod 12 encased by a sleeve 13. The throttle valve 11 controls delivery of the combustible mixture to the manifold 15, a fragment of which is shown in Fig. 4.

To automatically limit the engine speed by progressively closing the throttle valve, a centrifugal speed governor is mounted on the magneto shaft 20 (Figs. 1 and 2), and operatively connected with the throttle valve rod 12 to oscillate the latter.

In the construction shown, the governing weights 22 are mounted upon arcuate levers 23 which are pivoted at 24 to projections 25, carried by a plate or disk 26, secured to one side of a gear wheel 27, driven from timing gears (not shown).

The levers 23 have their short-arms loosely engaged in a groove 30 formed in the periphery of a collar 31, carried by a sliding sleeve 32, whereby the sleeve may be shifted by the weights along the supporting shaft 20.

The outer end of the sleeve 32 is thickened to form a hub 33, and when the governing weights 22 are moved radially outward by centrifugal force, their motion will be transmitted through their associated levers to the sleeve 32, causing the hub 33 to bear against a roller 35 which is journaled in arms 36 extending laterally from a vertical oscillatory shaft 37. When the pressure developed by the governing weights becomes sufficient to actuate these arms 36, the shaft 37 will be oscillated and its motion will be transmitted to the throttle valve rod 12 through the crank arm 40 at the upper end of the shaft 37, a link rod 41, to which said arm is secured, and a depending crank arm 43 (Fig. 6) fixed to the throttle valve rod 12. In this movement, the link rod 41 will be pushed to the right in Figure 1, and will oscillate the valve rod 12 counter-clockwise in Fig. 6, thus oscillating the throttle valve toward its closed position.

As heretofore constructed, the closing of the throttle valve by centrifugal governing weights has been opposed by springs associated with the governor itself. In ordinary centrifugal speed governors, tension springs are attached to the cross rods 45, carried by the weight supporting levers 23. But in my improved construction, the radial movement of the governing weights and the consequent oscillation of the valve rod 12 toward valve closing position is opposed by a tension spring 47 (Figs. 1, 4 and 5). This spring is coiled about the sections 48 and 49 of a push rod employed for manual adjustment of the throttle valve as will now be explained. The spring 47 normally holds the push rod sections 48 and 49 in abutting contact. The push rod has one section 48 connected with a depending crank arm 50 secured to the outer end of the valve rod 12 and the other section 49 is connected to an upwardly extending crank arm 51 which is fixed to a rock shaft 52, and the latter is rotatingly oscillated by a manually operable lever or arm 53 which is located at a point accessible to the driver of the tractor. By lifting the arm 53, i. e., swinging it in a counter-clockwise direction, motion will be transmitted through the spring 47 to the section 48, arm 50 and valve rod 12 to oscillate the latter in a clockwise direction and open the throttle valve, notwithstanding the action of the governing weights which may be simultaneously exerting a counter-pressure in a direction tending to close the throttle valve. Therefore in any given adjustment of the arm 53 the governing weights may still operate to automatically limit the speed, although a higher range of value movement and governing weight movement is made possible by thus manually opening the throttle.

Whatever may be the setting of the valve by manual adjustment of lever 53 the tension of spring 47 must always remain the same as long as the rod sections 48 and 49 are in abutting contact. If lever 53 is adjusted to push the throttle valve widely open to enable the tractor to overcome increased resistance due to hard soil or an ascending grade, there may be no increase of speed above the normal rate, and in that event there will be no separation of the rod sections 48 and 49. However, if the resistance to tractor movement decreases and allows the speed to rise above the normal rate, the outward movement of the governing weights will then progressively separate the rod sections until the speed is checked. The possible extent or range of this movement depends upon the position of the valve. Rod separation occurs only in response to speed and a corresponding outward movement of the governing weights, against an initial spring resistance which never varies, since the spring will not distend until the speed limit is exceeded and its normal degree of contraction and consequent initial resistance is fixed by abutment of the rod sections.

But in this manual adjustment of the throttle valve, the spring 47 will travel with the link rod sections to which its ends are attached and neither its tension nor its effect for resisting outward movement of the governing weights will be changed, except as the centrifugal action of the weights separate the rod sections. The fact that the link rod for operating lever 50 is formed in two sections, 48, and 49, makes possible an independent movement by expansion or contraction of the spring to permit the governing weights to limit the speed in each case within a range of value movement determined by the setting of the lever or arm 53.

The arm 53 may be held in its various positions of manual adjustment by means of a relatively fixed sector bracket 55, which may be engaged positively or frictionally by a suitable latch 56 carried by said arm 53.

It will be understood that the throttle valve will ordinarily be manually adjusted in correspondence to the resistance encountered or expected, and opening the throttle does not necessarily result in a higher engine speed. This is due to the fact that an upward pull upon lever 53 to open the throttle valve has no tendency to separate the rod section 49 from rod section 48, until after collar 31 contacts with disk 26. After 31 contacts with 26 the lever 53 may distend the spring to permit increased speed along a highway. Otherwise the upward pull upon lever 53 not only opens the throttle valve but the motion is transmitted to roller 35 which pushes upon hub 33 and causes the governor weights 22 to swing inwardly toward the axis of their supporting shaft 20 thus decreasing their centrifugal force at the given speed but increasing the mechanical advantage of the levers 23. The short arms of the latter exert substantially their maximum leverage when the parts are in the position shown in the drawings, the throttle valve being then almost fully open as indicated by dotted lines in Fig. 6. Therefore the governor weights will still hold the speed at approximately five miles per hour in the assumed setting of the tension of the spring, but the throttle valve being open, the engine can handle its maximum load at that speed.

If lever 53 is pushed downwardly, the throttle valve will be correspondingly closed, and roller 35 will tend to draw away from hub 33. Being then without resistance, the weights 22 will swing outwardly if any centrifugal force is being developed, thus keeping hub 33 in contact with roller 35. As the weights move outwardly, their force for a given speed tends to increase, but there is a corresponding decrease in their mechanical advantage exerted through their arms 23 and as the throttle is being closed, the speed is still limited to five miles per hour, that being the speed at which the weights will overcome the normal tension of spring 47. But if a higher speed results, the development by the governing weights of greater centrifugal force, separates the rod sections when the spring 47 is distended, and the resistance of the spring will progressively increase. Thus the governor will still be effective to automatically control speed, although its action may cover a wider speed range, resisted by increased spring tension only at the higher speeds which become possible at the wider range.

The spring 47 is preferably closely coiled in that portion which covers the abutting end portions of the rods 48 and 49, thus forming a sheath to prevent disalignment of the push rod sections. By providing the valve rod 12 with two crank arms 43 and 50, the manually operated one may be exposed, but the governor actuated rod 41 and its associated crank arm 53 may be housed by lateral extensions of the housing 13 to the casing which encloses the governor.

I claim:—

1. Throttle valve control mechanism comprising the combination with an engine throttle valve, of a speed governor operatively connected to the throttle valve, a manually operable member having extensible linkage connected to the throttle valve, a resiliently yieldable device under predetermined initial tension normally holding said linkage at minimum length and adapted when the speed governor reaches a predetermined speed to allow its extension towards closing position, whereby initial resistance to the action of the governor in response to speed may remain substantially the same in all positions of manual valve adjustment.

2. Throttle valve controlling mechanism comprising the combination with an engine provided with a throttle valve and an automatic speed governor adapted to progressively close such valve in response to excessive speeds, of manually operable valve adjusting devices operative while the engine is in motion, and provided with means for resiliently opposing the action of the governor with substantially uniform initial resistance in all positions of manual valve adjustment, said manually operable devices being adapted to yield in response to pressure transmitted from the governor to allow the valve to swing toward closing position without otherwise changing the manual adjustment of such devices.

3. Throttle valve controlling mechanism comprising the combination with an engine throttle valve, a manually operable mechanism for adjusting the throttle valve, a speed governor biased by resilient means under predetermined initial pressure and connected to the throttle valve, said resilient means associated with the manually operable mechanism for allowing the same to yield with invariable predetermined resistance and permit the speed governor control independently of the manual adjustment.

4. The combination of a throttle valve, a manually adjustable valve positioning member having connections including a portion adapted to yield under invariable predetermined initial and progressively increasing resistance when the valve is otherwise moved toward closing position, and a centrifugal speed governor operatively connected to move the valve toward closing position under a degree of speed determined by the resistance of said yielding portion of said connections.

5. Throttle valve controlling mechanism comprising the combination of a throttle valve, a manually operable valve adjusting member, means for securing said member in various positions of adjustment, connections for transmitting motion from said member to the valve, means for permitting said connections to yield extensibly with invariable predetermined initial resistance when the valve is otherwise adjusted toward closing position, and a centrifugal speed governor operatively connected to close the valve in response to speed sufficient to develop said predetermined pressure.

6. Throttle valve controlling mechanism comprising the combination with an engine throttle valve provided with an operating crank, a manually adjustable push rod formed in sections, of which one is operatively connected with the crank, tension means connecting the sections of the push rod and normally holding them in abutting relation to each other, an automatically acting centrifugal speed governor operatively connected to close the throttle valve when the speed of the engine is sufficient to separate the push rod sections by distention of said tension means, whereby said throttle valve is made subject to joint manual and automatic control while the engine is in operation.

7. The combination with an engine throttle valve having manually adjustable connections for positioning and repositioning the valve while the engine is in motion, of a centrifugal speed governor operatively connected to move the valve toward closing position, and tension means for predetermining the degree of speed at which the governor will operate, said manually operable connections being adapted to maintain said tension means under uniform normal tension at all positions of valve adjustment with the engine operating within the predetermined speed limit.

8. The combination with a throttle valve of an internal combustion engine, a speed governor operatively connected to the throttle valve, a manually adjustable member connected to the throttle valve, said manually adjustable member provided with means for yieldingly opposing the action of the speed governor with uniform resistance in all positions of manual valve adjustment.

9. The combination with the throttle valve of an internal combustion engine, of a manually adjustable member adapted to adjust the position of the throttle valve while the engine is in operation, a centrifugal speed governor operatively connected to progressively close the throttle valve when a predetermined speed is exceeded, and means connected with the manually adjustable member for maintaining a constant resistance to the initial action of the governor in all positions of valve adjustment.

10. The combination with an engine throttle valve provided with an automatically acting centrifugal speed governor, of manually adjustable connections operative while the engine is in motion for adjusting the valve independently of the governor, said connections including resiliently yielding means adapted to maintain substantially constant resistance to outward movement of the governing weights in all positions of valve adjustment.

ROLLO J. STICKLES.